United States Patent
David

(10) Patent No.: US 11,383,849 B2
(45) Date of Patent: Jul. 12, 2022

(54) SOLAR DRONE COMPRISING TWO AEROFOILS IN TANDEM TO WHICH PHOTOVOLTAIC CELLS ARE COUPLED

(71) Applicant: XSUN, Guerande (FR)

(72) Inventor: Benjamin David, Piriac sur Mer (FR)

(73) Assignee: XSUN, Guerande (FR)

( * ) Notice: Subject to any disclaimer, the term of this patent is extended or adjusted under 35 U.S.C. 154(b) by 367 days.

(21) Appl. No.: 16/471,992

(22) PCT Filed: Dec. 19, 2017

(86) PCT No.: PCT/FR2017/053708
§ 371 (c)(1),
(2) Date: Jun. 20, 2019

(87) PCT Pub. No.: WO2018/115724
PCT Pub. Date: Jun. 28, 2018

(65) Prior Publication Data
US 2020/0094978 A1    Mar. 26, 2020

(30) Foreign Application Priority Data

Dec. 23, 2016 (FR) .................................. 1663272

(51) Int. Cl.
*B64D 27/24* (2006.01)
*B64C 3/10* (2006.01)
(Continued)

(52) U.S. Cl.
CPC ............... *B64D 27/24* (2013.01); *B64C 3/10* (2013.01); *B64C 39/024* (2013.01); *B64C 39/08* (2013.01);
(Continued)

(58) Field of Classification Search
CPC ........ B64C 2201/021; B64C 2201/042; B64C 2201/104; B64C 2201/108; B64C 39/024;
(Continued)

(56) References Cited

U.S. PATENT DOCUMENTS 3,159,361 A * 12/1964 Weiland ................... B60V 1/14
                                                       244/12.1
3,358,946 A * 12/1967 Shye ....................... B64C 39/12
                                                       244/13
(Continued)

FOREIGN PATENT DOCUMENTS

CN        104890859 A      9/2015
FR           2880867 A1    7/2006

OTHER PUBLICATIONS

English translation of the Written Opinion of the International Searching Authority dated Mar. 7, 2018 for corresponding International Application No. PCT/FR2017/053708, filed Dec. 19, 2017.
(Continued)

*Primary Examiner* — Medhat Badawi
(74) *Attorney, Agent, or Firm* — David D. Brush; Westman, Champlin & Koehler, P.A.

(57) ABSTRACT

A flying drone, which includes: a fuselage composed of a single central body; wings composed of a forward aerofoil and an aft aerofoil, the aft aerofoil being offset in height and in length along the fuselage relative to the forward aerofoil; propulsion powered at least by electrical accumulators and/or photovoltaic cells; and photovoltaic cells essentially covering the upper faces of the forward aerofoil and the aft aerofoil.

6 Claims, 1 Drawing Sheet

(51) Int. Cl.
*B64C 39/02* (2006.01)
*B64C 39/08* (2006.01)

(52) U.S. Cl.
CPC .. *B64C 2201/021* (2013.01); *B64C 2201/042* (2013.01); *B64C 2201/104* (2013.01); *B64D 2211/00* (2013.01)

(58) Field of Classification Search
CPC ..... B64C 39/08; B64C 3/10; B64C 2201/165; B64D 2211/00; B64D 27/24; B64D 27/26; H01M 10/465; Y02T 50/50
See application file for complete search history.

(56) References Cited

U.S. PATENT DOCUMENTS

| | | | | |
|---|---|---|---|---|
| 3,834,654 | A * | 9/1974 | Miranda | B64C 39/068 244/13 |
| D234,079 | S * | 1/1975 | Whitener | D12/331 |
| 4,165,058 | A * | 8/1979 | Whitener | B64C 39/08 244/15 |
| 4,390,150 | A * | 6/1983 | Whitener | B64C 39/08 244/13 |
| 5,899,409 | A * | 5/1999 | Frediani | B64C 39/068 244/13 |
| 6,378,803 | B1 * | 4/2002 | Saiz | B64C 5/18 244/36 |
| 8,128,023 | B2 * | 3/2012 | Cazals | B64D 27/16 244/55 |
| 8,262,017 | B2 * | 9/2012 | Fraser | B64C 39/08 244/45 R |
| 8,356,770 | B2 * | 1/2013 | Parks | B64D 27/24 244/87 |
| 9,352,832 | B2 * | 5/2016 | Vander Lind | B64C 39/022 |
| 9,559,632 | B2 * | 1/2017 | Ahn | H01L 31/042 |
| 10,315,760 | B2 * | 6/2019 | Bevirt | B64C 11/28 |
| 10,384,774 | B2 * | 8/2019 | Vondrell | H02P 9/04 |
| 10,543,917 | B2 * | 1/2020 | David | B64C 39/08 |
| 10,562,626 | B2 * | 2/2020 | Dunn | B64C 3/54 |
| 10,640,212 | B1 * | 5/2020 | Dizdarevic | B64C 39/08 |
| 10,814,975 | B1 * | 10/2020 | Zongker | B64C 3/16 |
| 10,926,874 | B2 * | 2/2021 | Giannini | B64C 29/0033 |
| 11,111,010 | B2 * | 9/2021 | Bernard | B64C 39/024 |
| 2003/0080242 | A1 * | 5/2003 | Kawai | F02K 3/025 244/12.4 |
| 2003/0172922 | A1 * | 9/2003 | Haber | H02S 20/10 126/600 |
| 2009/0292407 | A1 * | 11/2009 | Minelli | B64C 27/26 701/3 |
| 2011/0168835 | A1 * | 7/2011 | Oliver | B64D 27/12 244/12.4 |
| 2011/0315809 | A1 * | 12/2011 | Oliver | B64D 27/06 244/12.4 |
| 2015/0183518 | A1 * | 7/2015 | Stuckl | B64D 27/24 244/13 |
| 2015/0256123 | A1 * | 9/2015 | Ahn | B64D 27/02 136/246 |
| 2015/0344134 | A1 * | 12/2015 | Cruz Ayoroa | B64C 39/12 244/48 |

OTHER PUBLICATIONS

International Search Report dated Feb. 13, 2018 for corresponding International Application No. PCT/FR2017/053708, filed Dec. 19, 2017.
Written Opinion of the International Searching Authority dated Feb. 13, 2018 for corresponding International Application No. PCT/FR2017/053708, filed Dec. 19, 2017.

* cited by examiner

SOLAR DRONE COMPRISING TWO AEROFOILS IN TANDEM TO WHICH PHOTOVOLTAIC CELLS ARE COUPLED

CROSS-REFERENCE TO RELATED APPLICATIONS

This Application is a Section 371 National Stage Application of International Application No. PCT/FR2017/053708, filed Dec. 19, 2017, the content of which is incorporated herein by reference in its entirety, and published as WO 2018/115724 on Jun. 28, 2018, not in English.

FIELD OF THE DISCLOSURE

The domain of the invention is the design and fabrication of flying drones.

The invention relates most particularly to fixed wing drones powered by photovoltaic cells.

BACKGROUND OF THE DISCLOSURE

Fixed wing drones correspond to drones driven by motors, and that comprise wings that provides sufficient lift for the drone to fly, starting from a predetermined drone displacement speed. These "fixed wing" drones are in contrast with "rotating wing" drones for which lift is provided by one or several rotors.

Flying devices of this type may be small or large and propelled by different types of motor drives.

Drones equipped with a motor drive using electricity have the advantages of long endurance. For example, prior art discloses such drones designed to fly for a long period at high or medium altitude.

Electrical accumulators and photoelectric cells are used to supply electrical power to these drones. During the day, the photovoltaic cells are dedicated to the electrical power supply of the drone and to recharging the electrical accumulators. The electrical accumulators take over at night, so that the drone can continue to fly until the photovoltaic cells are once again exposed to sunshine.

Prior art discloses solutions for improving the endurance and load carrying capacity of a drone, by storing electrical energy collected from sunshine.

Thus, drones are known with a single fuselage and one supporting wing, covered with photovoltaic cells, with a very long wingspan relative to the length of the drone.

Drones with a plurality of fuselages arranged in parallel are also known, supporting a long wingspan, the fuselages and the wing being covered entirely by photovoltaic cells.

Other known drones have oversized elements, so as to increase the drone area that can be covered with photovoltaic cells. Drones exist with an oversized tail fin.

These different solutions can increase the surface area of an aircraft on which photovoltaic cells can be coupled. However, these solutions induce many disadvantages.

However, known solutions make use of drone architectures that can cause high structural stresses when the drone is in flight. These structural stresses may be the result of an excessive wingspan and require the use of high technicity composite materials. The structural stresses of these architectures are then accompanied by a large wingspan and a high manufacturing cost of drones.

Furthermore, known architectures lead to bad placement of photovoltaic cells relative to the structural elements of the drone, consequently reducing the global insolation to which photovoltaic cells coupled on this drone are exposed. For example, it is observed that architectures using multiple fuselages can create shadow zones on drone surfaces on which photovoltaic cells are installed. Therefore such architectures are prejudicial to the extent to which photovoltaic cells are exposed to sunshine, even though these same photovoltaic cells add weight to the drone. Thus, there is a degradation to the performances and endurance of a drone designed with one of these architectures.

An example of a drone with an architecture using multiple fuselages is described in patent document published under number CN 104 890 859 A.

Drones with an ability to optimise the orientation of photovoltaic cells as a function of the position of the sun are also known. Such a drone is described in the patent document published as number US 2009/0292407 A1.

SUMMARY

One particular purpose of this invention is to overcome these disadvantages of prior art.

More precisely, the purpose of the invention is to disclose a fixed wing drone with electrical power supply by photovoltaic cells with better endurance performance than is possible according to prior art.

Another purpose of the invention is to disclose such a drone with aerodynamics that are optimised in comparison with equivalent drones disclosed in prior art.

Another purpose of the invention is to disclose such a drone with an architecture that introduces few structural constraints and to optimise its ability to store electrical energy through the use of photovoltaic cells.

These objectives, and others that will become clear later, are achieved by the invention that is aimed at a drone comprising:
  a fuselage composed of a single central body;
  wings composed of:
    a forward aerofoil defined by a wing surface area $A1$, a wingspan $E1$ and a chord $C1$, in which $A1=E1 \times C1$;
    an aft aerofoil defined by a wing surface area $A2$, a wingspan $E2$ and a chord $C2$, in which $A2=E2 \times C2$;
    the aft aerofoil being offset in height and in length on the fuselage from the forward aerofoil, the forward aerofoil and the aft aerofoil being straight wings;
  propulsion means powered at least by electrical accumulators and/or photovoltaic cells;
  photovoltaic cells essentially covering the upper faces of the forward aerofoil and the aft aerofoil;
characterised in that:
  the forward aerofoil is directly attached to a lower height on the central body extending from this central body, and has a zero or negative dihedral angle;
  the aft aerofoil is directly attached to an upper height on the central body extending from this central body, and has a zero or positive dihedral angle;
  $E1>E2$;
  the wing surface area $A2$ is essentially equal to the wing surface area $A1$.

Such a drone according to the invention has a large total wing surface area so that it can support a large number of photovoltaic cells, all with good aerodynamic properties.

The tandem configuration of the aerofoils and the size of the two wings relative to each other does not necessitate the use of heavy and/or expensive materials to make a single large aerofoil, or a principal aerofoil much larger than a second smaller aerofoil.

More precisely, the single central fuselage body and the direct attachment of aerofoils on this central body are such that the aerodynamic performances of the drone are not deteriorated relative to the use of a fuselage with multiple bodies and/or arms designed to support aerofoils.

The offset of wings in height and in length on the fuselage helps to combine a tandem combination of aerofoils increasing the total wing surface area and the number of photovoltaic cells, while reducing the total width of the drone, and maximising theoretical exposure of photovoltaic cells to the sun.

Due to the wing surface area A2 that is essentially equal to the wing surface area A1, the ratio between the total available wing surface area for photovoltaic cells and aerodynamic properties (good general stability, etc.) of the drone (and its energy needs) is optimised. In fact, this solution can double the wing surface area available for photovoltaic cells (two aerofoils with identical surface areas) by adding a mass that is insignificant relative to the total weight of the drone.

The forward and aft aerofoils, being straight wings, optimise the capacity of the drone to fly at subsonic speeds while reducing the possibility of projection of a shadow of one wing onto the other, due to the constant distance between the wings.

Essentially, the principle of the invention is to propose a large surface area of photovoltaic cells combined with optimised aerodynamic performances, therefore tending to significantly increase the autonomy of the drone.

According to one preferred embodiment, the aft aerofoil has a positive dihedral angle and the forward aerofoil has a zero dihedral angle.

This embodiment improves the longitudinal stability of the drone in flight.

According to one advantageous characteristic, the positive dihedral angle presented by the aft aerofoil is between 1 degree and 5 degrees.

Such a positive dihedral angle can make the drone sufficiently stable in flight while having photovoltaic cells on planes that can be inclined to benefit from high theoretical sunshine.

Advantageously, the forward aerofoil and the aft aerofoil are offset in length along the fuselage with a longitudinal separation distance DL equal to between $2.5 \times C1$ and $3.5 \times C1$.

Preferably, the forward aerofoil and the aft aerofoil are offset in height along the fuselage with a separation distance in height DH equal to between $0.4 \times C1$ and $0.6 \times C1$.

These relative positions of the aerofoils can improve the longitudinal stability of the drone in flight.

These relative positions can also optimise the aerodynamics of the drone and thus reduce its energy needs for flight. These positions also optimise the insolation capacity of photovoltaic cells positioned on the upper surfaces of the aerofoils, avoiding shadow phenomena of one aerofoil on the other.

According to another advantageous characteristic, the forward aerofoil has a negative twist equal to between −1 degree to −4 degrees.

This characteristic can result in an elliptical distribution of lift along the wing. Furthermore, stalling starts at the root, and then the end of the wing.

BRIEF DESCRIPTION OF THE DRAWINGS

Other characteristics and advantages of the invention will become clearer after reading the following description of one preferred embodiment of the invention given as an illustrative and non-limitative example, and the appended drawings among which.

DETAILED DESCRIPTION OF ILLUSTRATIVE EMBODIMENTS

Figure 1:
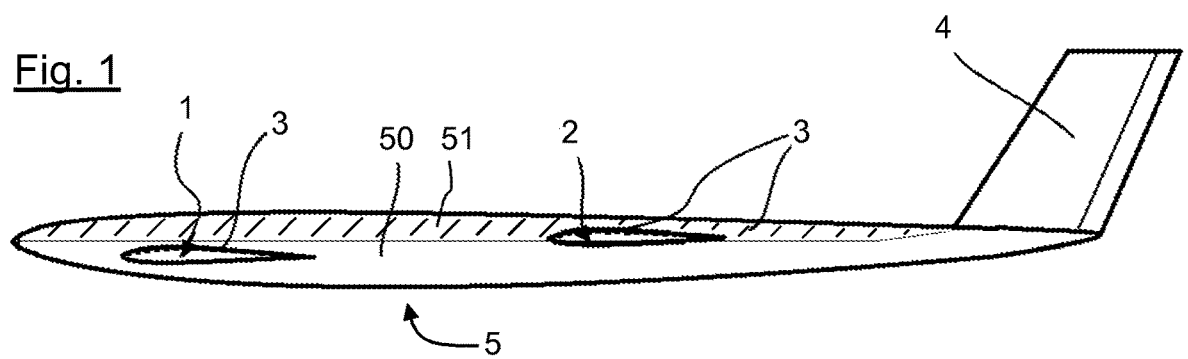
FIG. 1 is a diagrammatic lateral view of the drone according to the invention.
Figure 2:
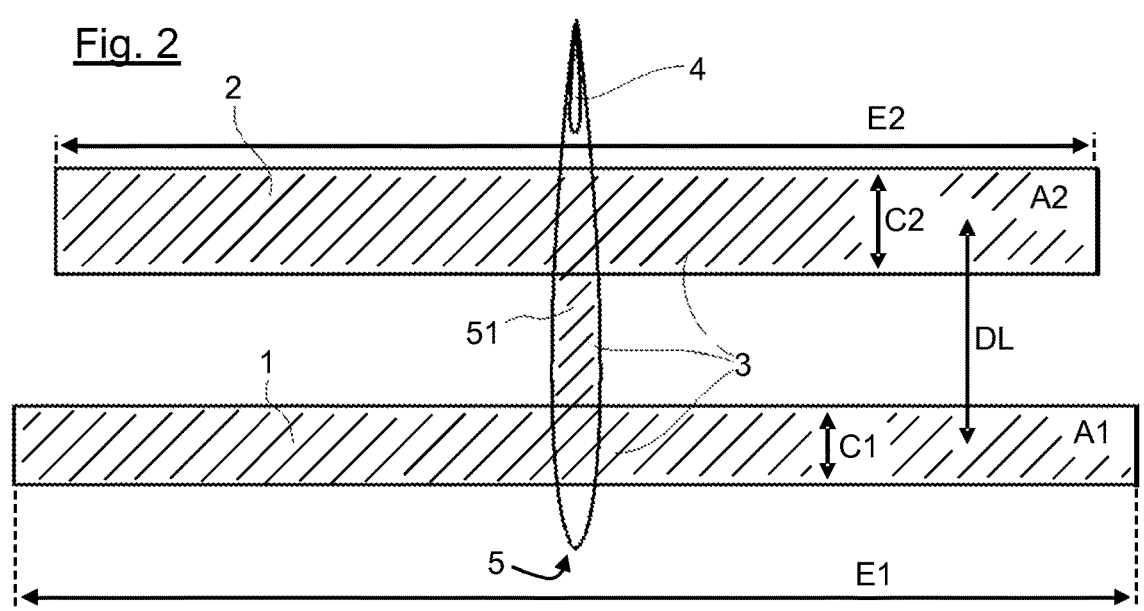
FIG. 2 is a diagrammatic top view of the drone according to the invention.
Figure 3:
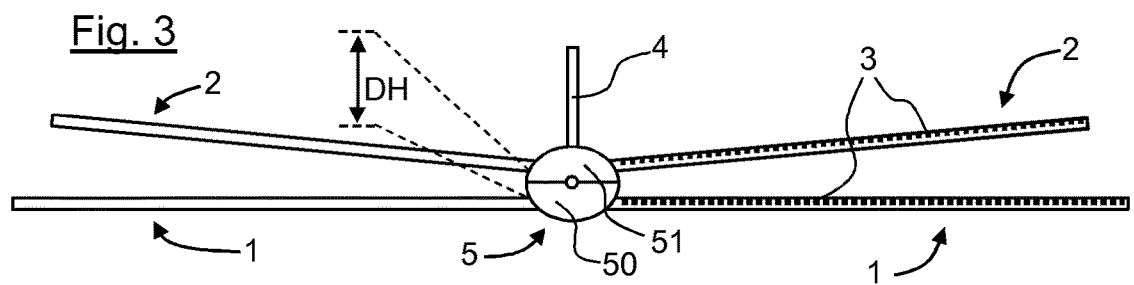
FIG. 3 is a diagrammatic front view of the drone according to the invention.

The drone according to the invention and illustrated in FIGS. 1, 2, and 3 comprises:
a fuselage;
wings composed of two aerofoils arranged in tandem;
a vertical stabiliser 4.

The drone is provided with propulsion elements (not shown) powered at least by electrical accumulators and/or photovoltaic cells. These propulsion elements may be in the form of one or several electric motors with propellers coupled to the fuselage and/or aerofoils.

With reference to FIGS. 1 to 3, the drone also comprises photovoltaic cells 3 that essentially cover the top faces of the two aerofoils.

The drone is thus of the "solar drone" type. The photovoltaic cells 3 enable the drone to supply power to its propulsion elements and recharge its electric accumulators when they are exposed to sunshine.

More precisely, the drone comprises wings composed of a forward aerofoil 1 and an aft aerofoil 2. These aerofoils are straight wings.

The expression "composed of" means that the drone comprises wings formed solely of two aerofoils. Consequently, the wings of the drone do not include a third horizontal plane that would provide lift in flight.

The forward aerofoil is defined by a wing surface area A1, a wingspan E1 and a chord C1, in which $A1=E1 \times C1$;

The aft aerofoil is defined by a wing surface area A2, a wingspan E2 and a chord C2, in which $A2=E2 \times C2$.

According to the principle of the invention, the wingspan E1 of the forward aerofoil 1 is larger than the wingspan E2 of the aft aerofoil 2, so as to improve the aerodynamics of the drone and its total wing surface area. Preferably, the wingspan E2 is essentially 11% less than wingspan E1. As a result, disturbances (wake vortices) created by the aerofoil have a lesser tendency to affect the aft aerofoil, and thus degrade the global performances of the drone.

Also according to the principle of the invention, and as illustrated in FIG. 2, the wing surface area A2 is essentially equal to the wing surface area A1.

According to the invention, the chord C2 is larger than the chord C1 so as to compensate for the wingspan E2 of the aft aerofoil 2 being smaller than the wingspan E1 of the forward aerofoil 1.

With reference to FIGS. 1 and 3, the forward aerofoil 1 is offset in height and in length along the fuselage relative to the aft aerofoil 2.

More precisely, and as illustrated in these figures, the fuselage is composed of a single central body 5 that has a lower height 50 and an upper height 51. This fuselage comprises a single body and is oblong in shape. On this fuselage, the forward aerofoil 1 is directly attached to the lower part 50 of the height of the central body 5 and extends from this central body, and the aft aerofoil 2 is directly attached to the upper part 51 of the height of the central body and extends from this central body.

As illustrated in FIG. 1, the upper height 51 of the central body 5 is covered with photovoltaic cells 3.

According to the preferred embodiment illustrated in FIG. 3, the aft aerofoil 2 has a positive dihedral angle and the forward aerofoil 1 has a zero dihedral angle. The positive dihedral angle presented by the aft aerofoil is advantageously between 1 degree and 5 degrees. As a result, disturbances created by the forward aerofoil have less impact on the aft aerofoil than a configuration in which the aerofoils as seen in a front view are superposed. The forward aerofoil also has a negative twist equal to between −1 degree to −4 degrees.

Less preferably, the aft wing may have a zero dihedral angle and/or the forward aerofoil may have a negative dihedral angle.

With reference to FIG. 2, the forward aerofoil and the aft aerofoil are offset in length along the fuselage with a longitudinal separation distance DL equal to between 2.5× C1 and 3.5×C1. The longitudinal separation distance DL is measured particularly between the focuses of the two wings.

As illustrated on FIG. 3 and as mentioned above, the forward aerofoil 1 and the aft aerofoil 2 are offset in height along the fuselage with a separation distance in height DH equal to between 0.4×C1 and 0.6×C1.

For guidance, the length of the fuselage of the preferred drone described above is about 3 metres and the maximum wingspan is about 5 metres. This drone is optimised particularly aerodynamically (limitation of energy necessary to fly) and energetically (capability of generating energy).

This drone is in NATO class 1 (−150 kg) and minimum category (from 2 to 20 kg).

Although the present disclosure has been described with reference to one or more examples, workers skilled in the art will recognize that changes may be made in form and detail without departing from the scope of the disclosure and/or the appended claims.

The invention claimed is:

1. A drone comprising:
    a fuselage composed of a single central body;
    wings composed solely of:
        a forward aerofoil defined by a wing surface area A1, a wingspan E1 and a chord C1, in which A1=E1×C1;
        an aft aerofoil defined by a wing surface area A2, a wingspan E2 and a chord C2, in which A2=E2×C2;
        wherein the aft aerofoil is offset in height and in length on the fuselage from the forward aerofoil, the forward aerofoil and the aft aerofoil is a straight wing aerofoil;
    at least one electrical accumulator;
    photovoltaic cells essentially covering upper faces of the forward aerofoil and the aft aerofoil; and
    a propulsion element powered at least by the at least one electrical accumulator and/or the photovoltaic cells;
    wherein:
    the drone is a fixed wing drone;
    the forward aerofoil is directly attached to a lower height on the central body, extends from the central body, and has a zero or negative dihedral angle;
    the aft aerofoil is directly attached to an upper height on the central body, extends from the central body, and has a zero or positive dihedral angle;
    E1>E2 and C2>C1; and
    the wing surface area A2 is essentially equal to the wing surface area A1.

2. The drone according to claim 1, wherein the aft aerofoil has a positive dihedral angle and in that the forward aerofoil has a zero dihedral angle.

3. The drone according to claim 2, wherein the positive dihedral angle presented by the aft aerofoil is between 1 degree and 5 degrees.

4. The drone according to claim 1, wherein the forward aerofoil and the aft aerofoil are offset in length along the fuselage with a longitudinal separation distance DL equal to between 2.5×C1 and 3.5×C1.

5. The drone according to claim 1, wherein the forward aerofoil and the aft aerofoil are offset in height along the fuselage with a separation distance in height DH equal to between 0.4×C1 and 0.6×C1.

6. The drone according to claim 1, wherein the forward aerofoil has a negative twist equal to between −1 degree to −4 degrees.

* * * * *